Oct. 29, 1963     R. H. GALE     3,108,936
FUEL ELEMENT FOR NUCLEAR REACTOR

Filed Oct. 28, 1959

INVENTOR
RICHARD H. GALE
BY Eldon H. Luther
ATTORNEY 3,108,936
FUEL ELEMENT FOR NUCLEAR REACTOR
Richard H. Gale, West Hartford, Conn., assignor to Combustion Engineering, Inc., New York, N.Y., a corporation of Delaware
Filed Oct. 28, 1959, Ser. No. 849,234
3 Claims. (Cl. 204—154.2)

This invention relates generally to fuel elements for nuclear reactors wherein the fuel is a ceramic disposed within a fluid-tight jacket and has particular relation to such a fuel element wherein the fuel is uranium carbide with the fuel element being organized for use in a water-cooled reactor.

It is recognized in the art that uranium carbide in the form of slugs or other configurations disposed within a protective metal jacket, such as a zirconium tube, is an exceedingly good reactor fuel. The properties of uranium carbide which make it a good fuel are the relatively high melting point of this ceramic together with its relatively high thermal conductivity and the high uranium density that it affords. The melting point of the uranium carbide is about 2500° C. and the thermal conductivity at 700° C. is about .06 calorie/second/centimeter/degree centigrade. This melting point corresponds favorably with other ceramic fuel, such as $UO_2$, while the thermal conductivity is generally much higher than other such fuel. The thermal conductivity of $UO_2$ at 700° C. is about .011 cal./sec./cm./° C. and this thermal conductivity decreases with an increase in temperature, being only .0055 cal./sec./cm./° C. at 2000° C. Although uranium carbide is a desirable fuel it has one serious disadvantage which has limited its use by reactor designers to gas-cooled or organic moderated reactor types with this disadvantage being the high reaction rate which uranium carbide has with water or water vapors at elevated temperatures such as 70° C. with this reaction changing the UC to an unusable powdery oxide. Because of this reaction with water, this fuel has not been employed with water-cooled reactors. The reaction at these elevated temperatures is quite rapid and should a pinhole develop in the jacket within which the fuel element is encased, so that moisture comes into contact with the UC, the entire fuel element is quickly destroyed.

It is a purpose of this invention to provide a fuel element employing UC as the fuel and which element may be employed with water-cooled reactors in comparative safety.

A further purpose of the invention is to provide such a fuel element for use with water-cooled reactors wherein the likelihood of moisture contacting the uranium carbide is very remote.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein.

Figure 2:
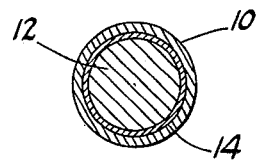
FIG. 2 is a transverse sectional view taken along line 2—2 of FIG. 1.
Figure 1:
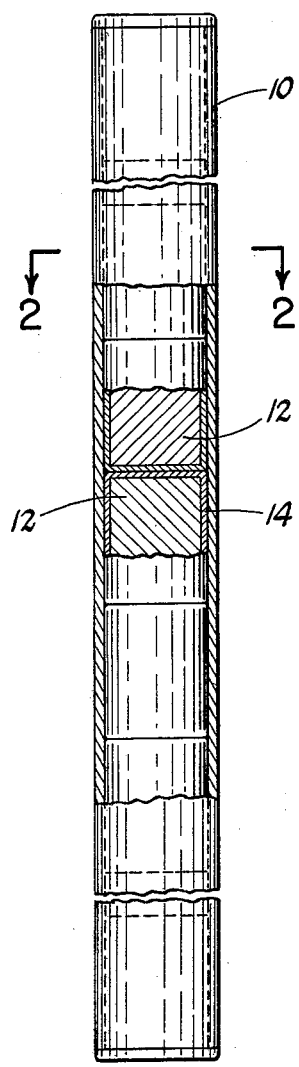
FIG. 1 is a vertical elevational view, partially in section, showing a fuel element embodying the present invention.

In accordance with the present invention the fuel element may taken the form of elongated cylindrical member, such as now conventionally provided by ceramic fuel elements, with the fuel element including an outer fluid tight metallic jacket within which is housed the ceramic fuel with the fuel, as in conventional practice, being formed in relatively short cylindrical slugs that are placed within the jacket.

In the illustrative organization depicted in the drawings, the metallic jacket 10 which provides a fluid tight enclosure for the ceramic fuel may be of any of the well known jacketing or cladding material for fuel elements for nuclear reactors with the requirements of these jacketing materials being high corrosion resistance and relatively low neutron absorption characteristics with aluminum, zirconium, and their alloys, as well as stainless steel, being commonly employed. Within jacket 10 is positioned the cylindrical slugs of UC fuel 12 with these slugs being positioned one on top of the other so that they fill the jacket.

Each of the slugs 12, prior to being inserted in jacket 10, is provided with a protective coating which is applied directly to the slug of fuel with this protective fluid-tight coating being either magnesium zirconate or zirconium carbide. Each of these materials is a ceramic or low neutron absorption cross section, of relatively high thermal conductivity and having a coefficient of expansion generally corresponding to that of uranium carbide. This protective fluid-tight coating, identified as 14 in the drawing, may be applied to the fuel slugs in any desired manner with flame spraying being a relatively simple and advantageous method of applying this ceramic coating, or, in lieu of flame spraying, a coating may be applied by covering the fuel slugs with the ceramic in a powdered form and then firing the fuel to sinter this powdered material and form a fluid impervious coating completely covering the fuel slug or other known methods of applying ceramic to materials may be employed.

The coating thus applied is relatively hard and glossy but at the same time is sufficiently flexible that it does not crack notwithstanding that the fuel slugs change shape somewhat during operation of the reactor with this change in shape being due to irradiation and temperature changes. Since the ceramic coating has generally the same coefficient of expansion as the ceramic fuel temperature changes have little tendency to crack the coating.

The fuel elements thus provided offer a dual barrier to the entrance of moisture into the uranium carbide ceramic fuel from exteriorly of the fluid-tight jacket 10. Furthermore, each of these ceramic fuel slugs has an independent fluid tight barrier of its own so that should a minute opening develop in the protective jacket 10, and further, should that protective ceramic coating on one of the fuel slugs fail, the entire fuel element will not be destroyed. Even to destroy one of the fuel slugs necessitates a failure of both the jacket 10 and the coating 14 which of course is unlikely. Accordingly, not only is the possibility of a fuel element failure greatly reduced with the organization of the invention but even when such a failure does occur, only a portion of the fuel element will be affected.

In order to further illustrate the invention, the following example is provided:

*Example*

There is provided in a boiling water nuclear reactor fuel elements constructed in accordance with the invention and which are 8'3" long with the protective jacket 10 being of Zircaloy-2 and having an outside diameter of .400" and a wall thickness of .03". Within this jacket are disposed UC fuel slugs with these slugs being inserted through the upper end of the tube, the lower end being sealed, and with the fuel slugs being .700" long and .330" in diameter. These fuel slugs consist of UC compacted in a pelletizer so as to form slugs with these UC slugs being coated with a fluid impervious ceramic coating of magnesium zirconium by means of flame spraying with a conventional flame spraying gun. This coating is applied by slowly passing the slugs on a suitable perforate, moving conveyor through a series of sprays from guns disposed at various positions with a coating of generally uniform depth being formed on the slugs having a thickness of about .003". After thus being coated and cooled, the slugs are tested to determine that the coating is fluid impervious with the slugs being placed on a moving belt that passes a bath of $H_2O$ at 90° C. and atmospheric pressure with the slugs being observed during immersion in the $H_2O$. A leak in the protective coating is thereby easily determined since the reaction of UC with $H_2O$ releases gas. The thus tested slugs are assembled into the jacket 10 filling the jacket, with the open end of the jacket then being sealed.

While I have illustrated and described a preferred embodiment of my novel organization, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What is claimed is:

1. A fuel element for a nuclear reactor comprising a fluid tight jacket of a corrosion resistant metal, a ceramic fuel disposed within said jacket in the form of numerous separate slugs and comprised of uranium carbide, each of said slugs of said ceramic fuel being encased within a protective fluid tight coating of ceramic selected from the group consisting of magnesium zirconate and zirconium carbide applied directly to the fuel.

2. A fuel element for a nuclear reactor comprising a fluid tight jacket of a corrosion resistant metal, a ceramic fuel disposed within said jacket in the form of numerous separate slugs and comprised of uranium carbide, each of said slugs of said ceramic fuel being encased within a protective fluid tight coating of magnesium zirconate applied directly to the fuel.

3. A fuel element for a nuclear reactor comprising a fluid tight jacket of corrosion resistant metal, a ceramic fuel disposed within said jacket in the form of numerous separate slugs and comprised of uranium carbide, each of said slugs of said ceramic fuel being encased within a protective fluid tight coating of zirconium carbide applied directly to the fuel.

References Cited in the file of this patent

UNITED STATES PATENTS

| | | |
|---|---|---|
| 2,799,642 | Hurwitz et al. | July 16, 1957 |
| 2,838,452 | West et al. | June 10, 1958 |
| 2,849,387 | Brugman | Aug. 26, 1958 |
| 2,852,460 | Abbott et al. | Sept. 16, 1958 |
| 2,854,737 | Gray | Oct. 7, 1958 |
| 2,863,816 | Stacy | Dec. 9, 1958 |
| 2,872,401 | Wigner et al. | Feb. 3, 1959 |
| 2,879,216 | Hurwitz et al. | Mar. 24, 1959 |
| 2,907,705 | Blainey | Oct. 6, 1959 |
| 2,934,483 | Bostrom | Apr. 26, 1960 |

FOREIGN PATENTS

| | | |
|---|---|---|
| 1,055,704 | Germany | Apr. 23, 1959 |